March 5, 1968  J. R. DALE ET AL  3,372,368
VERTICAL STABILIZATION OF LINE HYDROPHONE ARRAYS
Filed May 31, 1966
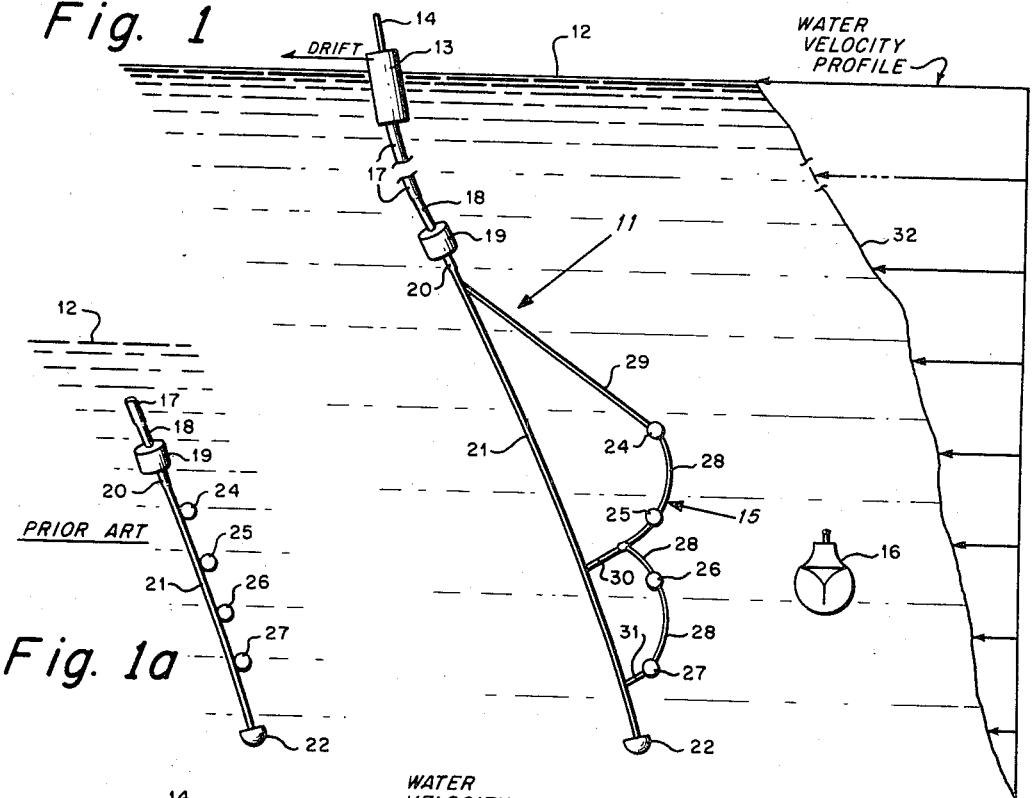
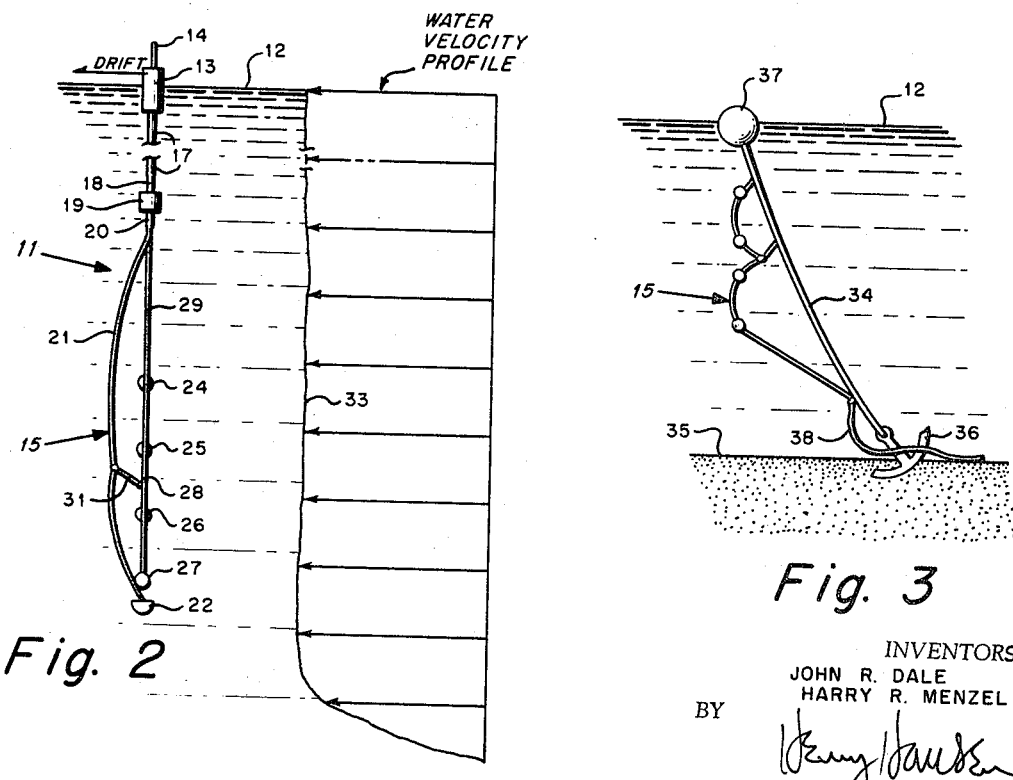
INVENTORS
JOHN R. DALE
HARRY R. MENZEL
BY
ATTORNEY

United States Patent Office 3,372,368
Patented Mar. 5, 1968

3,372,368
VERTICAL STABILIZATION OF LINE HYDROPHONE ARRAYS
John R. Dale, Willow Grove, and Harry R. Menzel, Hatboro, Pa., assignors to the United States of America as represented by the Secretary of the Navy
Filed May 31, 1966, Ser. No. 554,939
11 Claims. (Cl. 340—2)

ABSTRACT OF THE DISCLOSURE

A plurality of hydrophones or the like are maintained in a substantially vertical line array over a large range of water velocity profiles by a truss arrangement having members of preselected lengths. The truss also isolates the array from cable vibrations caused by fluid drag forces and thus substantially reduces cable strumming.

---

The invention described herein may be manufactured and used by or for the Government of the United States of America for governmental purposes without the payment of any royalties thereon or therefor.

The present invention relates generally to improvements in hydrophone arrays and the like and more particularly to a new and improved vertical line array wherein the array is maintained in a substantially vertical position over a large range of water velocity profiles and wherein cable strumming is significantly reduced.

Submarine detection systems employing sonar principles generally utilize line-type hydrophone arrays for obtaining sharply directional acoustic beam characteristics which are not to be found in the single hydrophone system. The line-type hydrophone system, however, can be most successfully employed if the longitudinal axis of the system does not deviate significantly from the vertical. Under this condition, the acoustic beam pattern for the array will be in a horizontal plane which intersects the hydrophone array.

Ocean currents are known to have finite water velocities which cause the prior art line-type hydrophone arrays to tilt as a direct function of the velocity of the water. The cable from which the array is suspended will accordingly bend or stream in the direction of the water velocity until a balance is reached between the array fluid drag forces and the gravitational loads. At this point, the array will stream at a particular tilt angle while moving at some velocity relative to the water. The difference between the velocity of the water and that of the hydrophone array is referred to as the relative drift rate. For example, in the Gulf Stream, water velocities range between 4½ knots at the surface and 1½ knots at 500 meters below the surface. With such a large variation in water velocities, a hydrophone array suspended 300 meters below the surface will be subjected to a velocity differential which will cause the array to be inclined such that its associated acoustic beam pattern will be greatly displaced from a horizontal plane and hence the effectiveness of the array to detect submarine signals is greatly reduced.

In addition to causing a high tilt angle, the relative drift rate also produces mechanical vibrations on the supporting cable, commonly called strumming, which cause the hydrophone array to be subjected to unwanted spurious signals. These spurious signals have the effect of reducing the signal detection capability since the background noise level is considerably increased.

Various means have been employed to minimize the tilt and strumming effects; for example, larger terminal weights have been attached to the bottom of the hydrophone array and compliant cables have been interposed between the array and the surface station or buoy. Additionally, to reduce the strumming effects, cable coverings have been employed to break up the periodicity of the fluid forces. However, these coverings generally increase the cable drag coefficient so as to cause the hydrophone array to increase the angle of tilt and hence reduce the signal detection capability of the array. Accordingly, there is a grave need both for reducing the angle of tilt and the strumming effects on hydrophone arrays so that the acoustic beam orientation is improved and the spurious noise signals are reduced.

The present invention fulfills this long existing need by providing a line-type array which retains its vertical position and hence a substantially horizontal beam pattern under relatively high drift rates while still reducing cable strumming effects.

The invention, however, is not intended to be limited to merely hydrophone arrays since the principles involved are readily applicable to suspending lights, or cameras, or even water current flow meters and the like in a vertical array so as to maintain their individual relative positions in a plane parallel to the water surface.

It is therefore an object of the present invention to provide a vertically stabilized array of elements in a horizontal fluid field in which the vertical geometry of the elements is independent of the relative fluid velocities for which the array is designed and in which the elements are isolated from the main cable vibrations.

Still another object of the invention is to provide a vertically stabilized line-type hydrophone array in which the associated acoustic beam characteristics are substantially normal to the array and in which target detection probabilities are increased.

Other objects and many of the attendant advantages of this invention will be readily appreciated as the same becomes better understood by reference to the following detailed description when considered in connection with the accompanying drawing wherein:

FIG. 1 diagrammatically illustrates a side elevation view of an embodiment of the invention with a line-type hydrophone array suspended from a buoy on the surface of a fluid medium and the associated water velocity profile.

FIG. 1a illustrates a side elevation of a prior art line-type hydrophone array;

FIG. 2 illustrates a side elevation of the embodiment of FIG. 1 in a generally uniform water profile; and FIG. 3 is a side elevation of an alternative embodiment of the invention in which a hydrophone array is suspended from an anchored buoy.

Briefly, the present invention provides for maintaining the vertical geometry of a line-type array independent of a range of relative water velocities while isolating the array from cable vibrations caused by fluid drag forces on the cable thereby providing a significant enhancement in the target detection capability.

Referring now to the drawing, wherein like reference characters designate like or corresponding parts throughout the several views, there is shown in FIG. 1 a drifting sonar buoy assembly 11, hereinafter referred to as a sonobuoy system floating on the surface of an ocean 12 used in detecting echo signals from a submarine 16 or other underwater sound sources. The sonobuoy 11 comprises a float or surface station 13, equipped with a radio transmitter (not shown) and an antenna 14 for radiating signals detected by a line-type array 15 to an aircraft or other receiving means in the vicinity. Suspended from one end of the float 13 is a non-compliant cable section 17 which may be of various lengths depending upon the desired depth of the line-type array 15. Interposed between the non-compliant cable section 17 and a negatively buoyant isolation mass 19 is a compliant cable section 18 which in conjunction with the isolation mass 19 tend to isolate the array 15 from surface motion. In addition, cables 17 and 18 each contain electrical conductors for conveying the detected signals from the array 15 to the surface station 13.

The degree of isolation achieved by the motion of the mass 19 with respect to the motion of the float 13 can be analogized to that of a spring-mass system in which a weight is suspended from one end of a spring to the other end of which is attached to a movable body. If the weight is released when the movable body is in a fixed posiion, the system will oscillate at some frequency which may be referred to as $f_n$, the natural frequency of oscillation. Assume that $f_n$ is extremely low, for example, 0.1 c.p.s., then if the movable body is moved through some displacement at a frequency greater than $f_n$, the displacement of the mass will be considerably less than that of the movable body. In other words, if the frequency of the forcing function (movable body) is greater than the natural frequency of the spring-mass system, the displacement of the mass will be considerably less than that of the forcing function. A classical approach to this problem is discussed in Mechanics of Vibration by H. M. Hansen and P. F. Chenea at page 78.

From the above discussion, it can be seen that the motion of the isolation mass 19 is considerably less than that of the float 13 and accordingly the line-type array 15 remains essentially fixed and independent of wave motion.

Extending from the bottom portion of the isolation mass 19 is a short section of compliant cable 20 to which is attached a main tension cable member 21 of small diameter, low-drag cable weighted at the bottom end with a weight 22 for maintaining a constant tension on cables 17, 18, 20 and 21. A plurality of hydrophone array elements or transducers 24, 25, 26 and 27 are attached to the tension member 21 by a truss arrangement of streamers 29, 30 and 31 and by spacers 28 at discrete tie points such that the axis of the array is near vertical when the tension member 21 is streaming.

The degree of streaming or tilt angle as it is also referred to, is directly related to the relative drift rate of the sonobuoy system 11. In U.S. Patent 3,082,400 to Coop, a plot of tilt angle versus relative drift rate reveals that the relationship is non-linear and increases rapidly for drift rates in excess of one-half knot. Accordingly, it is necessary to design a truss configuration which will maintain the array 15 in a substantially vertical position for relative drift rates between 0 and 4½ knots. Such a configuration will be described later.

FIG. 1 illustrates a typical water velocity profile 32 in which the water velocity is generally decreasing with increasing depth. Since the sonobuoy system 11 exhibits a certain drag characteristic, its velocity will be less than that of the water, and accordingly, will have a relative drift rate. This particular type of profile gives rise to cable vibrations or strumming, which, in the prior art systems as illustrated in FIG. 1a, are coupled directly to the array elements and accordingly cause unwanted spurious hydrophone signals.

As illustrated in FIG. 1, the array elements 24 through 27 are displaced from the main tension member 21 by the truss arrangement of streamers 29 through 31 and spacers 28. In this way the vibrations which are normally coupled directly to the array elements of FIG. 1a, are reduced by the streamers 29 through 31 so that the array elements are subjected to lesser amplitude vibrations. Additional attenuation of the vibrations can be achieved by employing compliant cable streamers and spacers rather than non-compliant cables.

In general, four to six hydrophone elements are aligned as illustrated in FIG. 1, with the element spacing and number dependent upon the particular frequency and acoustic beam characteristics desired. For example, assume that it is required to have an acoustic beam characteristic having a maximum reception capability at 1.67 kc./s. Then the spacing of the elements can be determined from an application of the basic velocity of propagation equation, which relates the wave length $\lambda$, the frequency $f$, and the velocity of propagation $v$ in the following manner:

$$\lambda = \frac{v}{f}$$

Since the desired frequency is 1.67 kc./s. and the velocity of propagation in water is 5000 ft./sec., it is found that the wavelength $\lambda$ is approximately equal to 3 feet. However, since it is more desirable to operate at one-half wavelength intervals, the hydrophone elements 24 through 27 should then be spaced at 18-inch intervals to obtain a maximum frequency response at 1.67 kc./s.

The length of the streamers 29 through 31, as discussed previously, are adjusted so that in a particular range of relative drift rates the array elements 24 through 27 will stream in essentially a vertical position. This is achieved by selecting appropriate tie points on the main tension member 21 such that with the water velocity profile 32, for example, the elements are vertical and also with a water velocity profile 33, as illustrated in FIG. 2, the elements are vertical. While an analytical approach can be taken to determine these lengths, it has been found to be more convenient to use a graphical type solution. Accordingly, FIG. 1 illustrates a condition in which the length of streamer 29 is 36 inches in length, streamer 30 is 9 inches in length, streamer 31 is 4½ inches in length and spacers 28 are 18 inches in length. The main tension member 21 is 85½ inches in length from the tie point of streamer 29 to the tie point of streamer 31 with streamer 30 tied at a point 58½ inches from the tie point of streamer 29. In this way, at a tilt angle of approximately 20° as illustrated in FIG. 1, the array elements 24 through 27 are streaming vertically. In the zero tilt angle condition, as illustrated in FIG. 2, the array 15 will also stream vertically since the sum of the lengths of streamer 29 and the lengths of the spacing cables 28 between elements 24 through 27 is less than the length of the main tension member 21.

Accordingly, in either of the two conditions illustrated in FIGS. 1 and 2, the line-type array 15 will remain in a substantially vertical position and therefore the acoustic beam pattern will be along a plane normal to the vertical array.

If surface wind conditions vary, the particular water velocity profile as illustrated in FIGS. 1 and 2 will also vary and the line-type array 15 may tilt more or less depending upon the particular wind conditions, in which case the line-type array 15 will no longer be in a substantially vertical position. The acoustic beam characteristics will then vary from the desired horizontal plane, however, a certain degree of tilt is permissible before the sonobuoy system performance degrades appreciably.

Referring now to FIG. 3, there is shown an alternative embodiment of the invention in which the line-type array 15 is suspended from a cable 34 having one end moored to the ocean bottom 35 by an anchor 36 for example, and the other end supported by a surface float 37. In this particular configuration, the received signal from the array 15 is passed to a receiver (not shown) through a communications cable 38. An isolation mass 19 and a compliant cable 18 may be employed if desired, however, since the array 15 is secured to the ocean bottom, the surface wave motion will have little, if any, effect upon the array.

Obviously, many modifications and variations of the present invention are possible in light of the above teachings. It is therefore to be understood, that within the scope of the appended claims, the invention may be practiced otherwise than as specifically described.

What is claimed is:
1. A transducer apparatus for detecting underwater objects comprising:
a free-floating surface station;

a plurality of transducers connected in a flexible line-type array and depending from said station; and means interposed between the ends of said array for maintaining said array substantially vertical when deployed in a fluid flow having a range of velocity profiles.

2. A line-type array for detecting underwater objects comprising:

a free-floating surface station;

array means for receiving underwater sound signals;

cable means extending from said station; and truss means including a main tension member extending from said cable means and a plurality of streamers connected to said member and said array means for maintaining said array means in a substantially vertical position over a range of drift rates.

3. A line-type array as recited in claim 2 wherein said array means comprise:

a plurality of transducer elements operatively connected to said plurality of streamers for detecting underwater sound signals.

4. A line-type array as recited in claim 3 wherein said truss means further comprises:

spacer means interposed between said plurality of transducer elements for maintaining substantially equidistant spacing therebetween.

5. A line-type array as recited in claim 4 wherein said cable means comprises:

a non-compliant cable section having one end attached to said station;

a compliant cable section having one end attached to the other end of said non-compliant cable section; and isolation means attached to the other end of said compliant cable section for isolating the motion of said station from said array means, whereby said array means maintains a substantially constant depth independent of the motion of said station.

6. A line-type array as recited in claim 5 wherein said truss means further comprises:

means connected to said member for maintaining tension on said member.

7. An apparatus for vertically stabilizing a line-type array in water comprising:

a free-floating surface station;

a non-compliant cable having one end connected to said station;

a compliant cable connected at one end thereof to the other end of said non-compliant cable;

a plurality of array elements spaced apart from each other;

means connected to the other end of said compliant cable for isolating said plurality of array elements from the surface motion of said body of water; and truss means displacing said array from said non-compliant cable and said compliant cable and maintaining said array in a substantially vertical position over a range of water velocities.

8. An apparatus as recited in claim 7 wherein said truss means comprises:

a main tension member extending from the means for isolating;

a plurality of streamers connected to said member and said array elements for vertically stabilizing said elements; and spacer means interposed between said plurality of array elements for maintaining substantially equidistant spacing therebetween.

9. An apparatus as recited in claim 8 wherein said truss means further comprises:

means connected to said member for maintaining a constant tension on said member.

10. An apparatus as recited in claim 9 wherein said plurality of array elements comprise transducer elements.

11. An apparatus as recited in claim 7 further comprising:

a main tension member connected at one end to said non-compliant cable; and means connecting the other end of said tension member to the bottom of said body of water for mooring said line-type array, whereby said line-type array maintains a relatively fixed position in the water.

References Cited

UNITED STATES PATENTS

| | | |
|---|---|---|
| 1,797,351 | 3/1931 | Kunze. |
| 2,838,741 | 6/1958 | Mason _____ 340—2 |
| 3,024,440 | 3/1962 | Pence _____ 340—4 |
| 3,027,539 | 3/1962 | Stillman _____ 340—5 |
| 3,141,148 | 7/1964 | Hueter _____ 340—9 |
| 3,299,398 | 1/1967 | Hersey et al. _____ 340—2 |

RICHARD A. FARLEY, *Primary Examiner.*